United States Patent
Broyles et al.

(10) Patent No.: US 8,438,624 B2
(45) Date of Patent: May 7, 2013

(54) SYSTEMS AND METHODS OF MODIFYING SYSTEM RESOURCES

(75) Inventors: Paul J Broyles, Cypress, TX (US); Bernard D Desselle, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 12/397,076

(22) Filed: Mar. 3, 2009

(65) Prior Publication Data

US 2010/0229233 A1 Sep. 9, 2010

(51) Int. Cl.
*G06F 21/00* (2006.01)

(52) U.S. Cl.
USPC .............. 726/10; 726/2; 726/3; 726/4; 726/5; 726/6; 726/7; 726/8; 726/9; 726/11; 726/12; 726/21; 726/22; 726/13; 726/14; 726/15; 726/17; 726/18; 726/19; 713/156; 713/157; 713/158

(58) Field of Classification Search ............ 726/10, 726/2–9, 11–21; 713/156–158, 175
See application file for complete search history.

(56) References Cited

U.S. PATENT DOCUMENTS

| | | | |
|---|---|---|---|
| 5,155,847 A | 10/1992 | Kirouac et al. | |
| 6,904,592 B1 | 6/2005 | Johnson | |
| 6,934,693 B2 * | 8/2005 | Stefik et al. | 705/51 |
| 7,313,512 B1 * | 12/2007 | Traut et al. | 703/23 |
| 7,373,307 B2 | 5/2008 | Merkin et al. | |
| 2003/0097655 A1 * | 5/2003 | Novak | 725/31 |
| 2004/0073670 A1 * | 4/2004 | Chack | 709/225 |
| 2005/0033850 A1 * | 2/2005 | Kirkland | 709/228 |
| 2006/0031679 A1 * | 2/2006 | Soltis et al. | 713/182 |
| 2006/0064582 A1 * | 3/2006 | Teal et al. | 713/156 |
| 2006/0069653 A1 * | 3/2006 | Lelikov et al. | 705/59 |
| 2006/0100962 A1 * | 5/2006 | Wooldridge et al. | 705/50 |
| 2008/0098216 A1 * | 4/2008 | Scovetta | 713/165 |
| 2010/0030982 A1 * | 2/2010 | Sela et al. | 711/162 |
| 2010/0180340 A1 * | 7/2010 | Zola et al. | 726/22 |

* cited by examiner

*Primary Examiner* — Andy Rao
*Assistant Examiner* — Shan Elahi

(57) ABSTRACT

A method for modifying one or more system resources is provided. One or more licenses for modifying one or more system resources on a client device can be acquired. An authenticator can be generated and stored on a remote server. The authenticator can be transferred to the client device. The client device can be connected to the remote server and the remote server can authenticate the client device via the authenticator. The remote server can confirm the availability of one or more licenses, and based on the availability of one or more licenses, modify one or more system resources disposed in, on, or about the client device. After modifying the one or more system resources the remote server can decrement the remaining license count.

20 Claims, 3 Drawing Sheets

SYSTEMS AND METHODS OF MODIFYING SYSTEM RESOURCES

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

Chip manufacturers, in an effort to standardize and reduce manufacturing costs, frequently produce a chip family consisting of a single chip design that incorporates all available features. To provide cost and performance differentiation within the chip family, one or more features disposed on the chip may be disabled, precluding the use thereof by the end user of the chip. Since system manufacturers use the disabled chips in building computing systems, it becomes possible for the chip and/or system manufacturer to permit modification of system performance by permitting the remote modification of one or more system resources within the chips disposed within a system located at the client's site. In a similar manner, software and firmware designers will often produce a single package containing all available software and firmware options.

SUMMARY OF THE INVENTION

So that the manner in which the above recited features of the present invention can be understood in detail, a more particular description of the invention may be had by reference to one or more exemplary embodiments, some of which are illustrated in the appended figures. It is to be noted, however, that the appended figures illustrate only a limited number of exemplary embodiments of the invention and are therefore not to be considered limiting of its scope, for the invention may admit to an unlimited number of other equally effective embodiments.

A method for remotely modifying one or more system resources is provided. In one or more embodiments, a client can acquire one or more licenses, for example one or more electronic or digital licenses, for modifying one or more system resources disposed in, on, or about one or more client devices acquired from a vendor. The one or more licenses can be stored on a remote server, for example a remote server maintained by the vendor. The vendor can generate one or more authenticators, for example one or more digital certificates, which can be stored on the remote server. In one or more embodiments, all or a portion of the one or more authenticators can be transferred to the one or more client devices. Upon establishing an operable connection between the client device and the remote server, the remote server can authenticate the client device by confirming the authenticator supplied by the client device. The remote server can confirm the availability of one or more licenses, and based on the availability of the one or more licenses, modify one or more system resources disposed in, on, or about the one or more client devices. After modifying the one or more system resources the remote server can decrement the remaining license count.

A system for remotely modifying one or more system resources is also provided. In one or more embodiments, the system can include one or more means for storing one or more licenses on a remote server, for example one or more electronic or digital licenses stored on one or more vendor enterprise servers. In one or more embodiments, one or more authenticators, for example one or more digital certificates, can be generated by and stored within the remote server. In one or more embodiments, the remote server can transmit the one or more authenticators to one or more client devices. For example, the vendor's enterprise servers can electronically transmit via the internet the one or more digital certificates to one or more client devices, for example one or more thin clients containing one or more system resources. In one or more embodiments, the one or more client devices can be operatively connected to the remote server. The remote server can authenticate the one or more client devices using all or a portion of the one or more authenticators disposed in, on, or about the client device. After authentication, the remote server can determine the eligibility of the one or more client devices to modify one or more system resources. For example, based upon the transmission of all or a portion of the digital certificate from the customer thin client, the vendor's enterprise server can determine, based on the validity of the digital certificate and availability of one or more licenses, which of the system resources on the customer's thin client can be modified. After determining which of the system resources are eligible for modification, the remote server can then modify those system resources on the one or more client devices. After modifying the one or more system resources on the one or more client devices, the remote server can decrement the one or more licenses stored on the remote server.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a block of logic, software, or other entity. Logical and/or physical communication channels can be used to create an operable connection.

A "certificate" or "digital certificate" is an encrypted and digitally signed attachment to an e-mail message or downloaded file attesting that the received data originates from the claimed source and that the data has not been altered, amended, or otherwise modified while en route from the source device to the destination device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
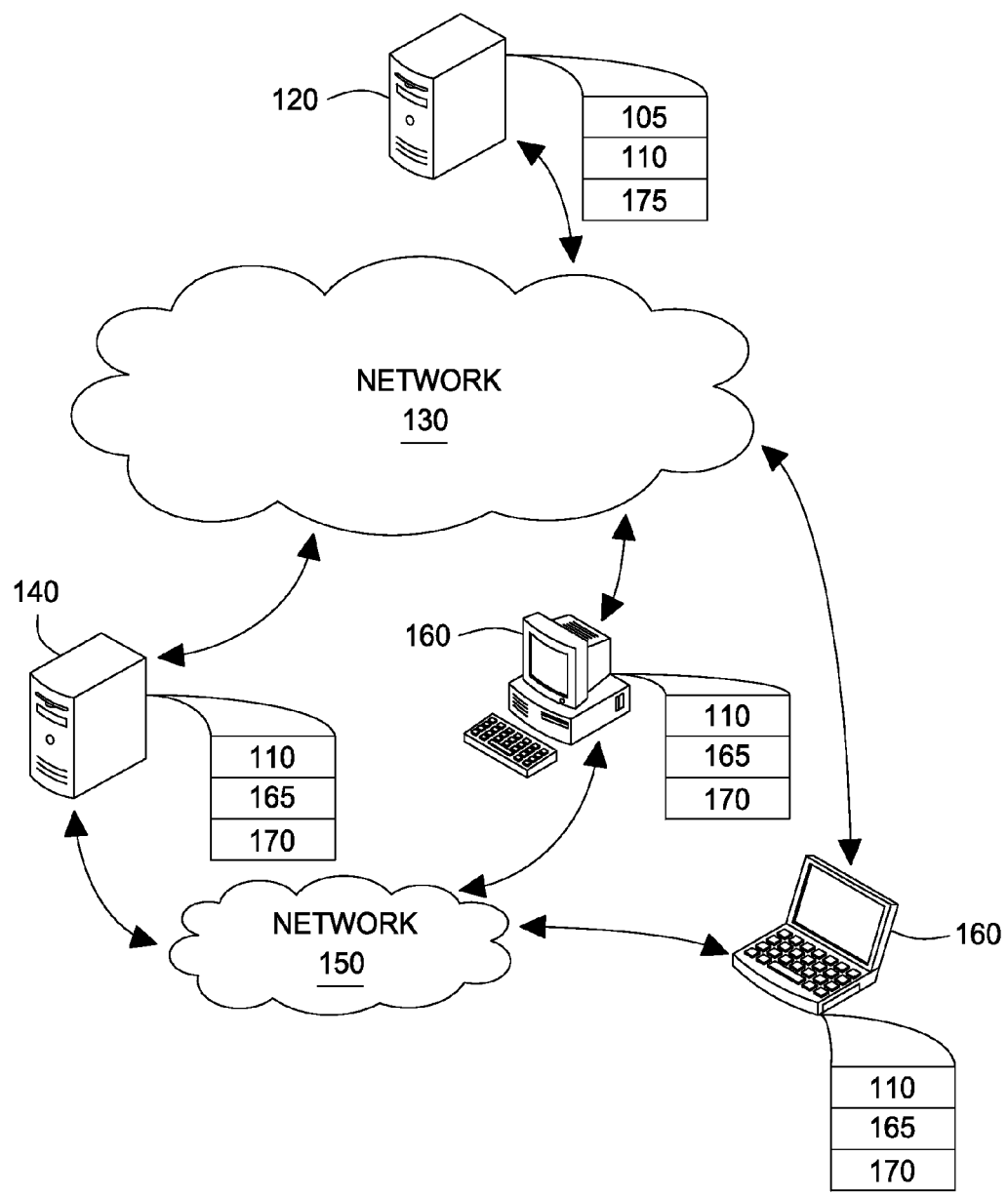
FIG. 1 is a schematic diagram depicting an illustrative system for remotely modifying one or more system resources, according to one or more embodiments described herein.

FIG. 1 is a schematic diagram depicting an illustrative system 100 for remotely modifying one or more system resources, according to one or more embodiments. In one or more embodiments, the illustrative system can include one or more remote servers 120, one or more client servers 140, and one or more client devices 160. In one or more embodiments, one or more authenticators 110 can be disposed in, on, or about the one or more remote servers 120. In one or more embodiments, the one or more remote servers 120 can be disposed proximate the one or more client devices 140, 160. In one or more embodiments, the one or more remote servers can be disposed remote from the one or more client devices 140, 160. In one or more embodiments, the one or more remote servers 120 can be any device suitable for storing digital data in a non-volatile memory, transmitting digital data to one or more remote devices, and receiving digital data from one or more remote devices. In one or more specific embodiments, the one or more remote servers 120 can include, but are not limited to, one or more file servers, for example one or more enterprise servers. In one or more specific embodiments, the one or more remote servers 120 can include, but are not limited to, one or more vendor enterprise servers suitable, in whole or in part, for the storage, receipt, and transmission of client digital data. In one or more embodiments, the one or more remote servers 120 can be operably connected to one or more data transmission networks, including, but not limited to, one or more local area networks ("LANs"), one or more wide area networks ("WANs"), one or more intra-company, or private, networks, one or more intercompany, or public networks, or the world wide web.

In one or more embodiments, one or more licenses 105 can be disposed in, on, or about the remote server 120. In one or more embodiments, the one or more licenses can be uniquely identifiable, indentifying one or more clients, for example a client possessing one or more client servers 140 and/or client devices 160. In one or more embodiments, the one or more licenses 105 can be uniquely identifiable, for example, the one or more licenses 105 can include one or more unique codes or scripts suitable for distinguishing any one license 105 from other licenses. In one or more embodiments, the one or more licenses 105 can include one or more digital identifiers, for example, one or more codes or scripts identifying the licensee, i.e. the client possessing the license 105.

A "script" or "computer script" as used herein is a series of machine readable instructions, expressed in a scripting language, capable of instructing a computing device to perform a specific procedure or process, for example logging on to an e-mail system. Scripts are often used to enable a computing device to automatically perform common system tasks or routines, such as establishing communications between two or more networked computing devices. Scripts can be stored as digital data and executed as any other machine readable instruction set. Scripts can be interpreted rather than compiled.

In one or more embodiments, each of the one or more licenses 105 can permit the remote modification of one or more disabled system resources 165. For example each of the one or more licenses 105 can permit the enablement of one or more disabled system resources 165 or, conversely, each of the one or more licenses 105 can permit the disablement of one or more enabled system resources 165. In one or more embodiments, each of the one or more licenses 105 can modify a plurality of system resources 165. In one or more specific embodiments, the one or more licenses 105 can be issued by a vendor to a customer to permit modification of one or more system resources 165 disposed in, on, or about the one or more client devices 160 at the discretion of the client.

In one or more embodiments, one or more authenticators 110 can be disposed in, on, or about the remote server 120. In one or more embodiments, the one or more authenticators 110 can be digital data or scripts generated by a vendor that are stored or otherwise disposed in, on, or about the remote server 120. In one or more embodiments, the one or more authenticators 120 can include, but are not limited to, one or more digital certificates or the like. In one or more embodiments, the one or more authenticators 110 be used by the remote server 120 to identify one or more remote devices or systems, for example to identify the one or more client servers 140 and the one or more client devices 160, to the remote server 120.

In one or more embodiments, the one or more authenticators 110 can include, but are not limited to, one or more digital certificates suitable for identifying a particular client, client server 140, or client device 160 to the remote server 120. For example, in one or more specific embodiments, the one or more authenticators can identify the one or more client devices 160 to the remote server 120. In one or more embodiments, such identification can authenticate the one or more client devices 160 to the remote server 120. In one or more embodiments, authentication of the one or more client devices 160 to the remote server 120 can be useful in determining whether unused licenses 105 remain on the remote server 120. In one or more specific embodiments, such authentication can be useful in determining which of the system resources 165 on the client device 160 can be modified by the remote server 120. For example, the authentication process can identify the portions of software, firmware, or hardware suitable for modification, such as enablement or disablement of all or a portion thereof, by the remote server 120.

In one or more embodiments, the remote server 120 can be operatively connected to one or more devices, for example one or more client servers 140 and/or one or more client devices 160. In one or more specific embodiments, the client server 140 can receive one or more authenticators 110 from the device 120. In one or more specific embodiments, after receiving the one or more authenticators 110 from the device 120, the client server 140 can distribute all or a portion of the one or more authenticators 110 to all or a portion of the one or more client devices 160. In one or more specific embodiments, the remote server 120 can be a vendor enterprise server adapted to generate one or more authenticators 110. The one or more authenticators 110 can be transmitted from the remote server 120 via a network 130, for example the internet to the client server 140. The client server 140 can, in one or more specific embodiments, store all or a portion of the received one or more authenticators 110.

In one or more embodiments, the client server 140 can include any system, device or any combination of systems and/or devices suitable for the receipt, transmission and/or storage of digital data. In one or more embodiments, the client server 140 can be operably connected to the remote server 120 via one or more data transmission networks, for example, a LAN, WAN, or the internet. In one or more embodiments, the client server 140 can be operably connected to one or more client devices 160, via one or more data transmission networks, for example a LAN, WAN, or the internet. In one or more embodiments, the client server 140 can be operably connected simultaneously to the remote server 120, for example a vendor enterprise server, via the internet and to one or more client devices 160 via a corporate intranet LAN, or WAN. In one or more embodiments, the client server 140 can include, but is not limited to, one or more commercial servers, or one or more home, i.e. non-commercial, servers. In one or more embodiments, the client server 140 can include, but is not limited to, one or more desktop servers, one or more rack-mounted servers, one or more freestanding servers, or any number or combination thereof.

In one or more embodiments, the one or more client servers 140 can be operably connected to one or more client devices 160 via one or more data transmission networks, for example a LAN, WAN, or the internet. In one or more embodiments, the one or more client servers 140 can transmit or otherwise communicate the one or more authenticators 110, in whole or in part, to the one or more client devices 160. In one or more embodiments, one or more system resources 165 can be disposed in, on, or about the one or more client devices 160. In one or more embodiments, the one or more system resources 165 can be identical between each of the one or more client devices 160. In one or more embodiments, the one or more system resources 165 can be partially or wholly distinct between each of the one or more client devices 160. In one or more embodiments, the one or more system resources 165 can include, but are not limited to, one or more software routines, one or more firmware routines, one or more hardware devices, or any combination or frequency thereof.

The one or more client devices 160 can include, but are not limited to, one or more portable computing devices, one or more desktop computing devices, one or more mainframe computing devices, one or more handheld computing devices, any combination and/or frequency thereof. The one or more client devices 160 can be operably connected to either or both the client server 140 and/or the remote server 120 via one or more networks, including wired, wireless, cellular, or any combination thereof.

In one or more embodiments, one or more scripts 170 can be partially or completely disposed in, on, or about the one or more client devices 160. In one or more embodiments, the one or more scripts 170 can include, in whole or in part, one or more machine executable instruction sets. In one or more embodiments, successful execution of at least a portion of the one or more scripts 170 can permit the operable connection of the client device 160 to the remote server 120. In one or more embodiments, the one or more scripts 170 can transmit all or a portion of the one or more authenticators 110 from the client device 160 to the remote server 120 thereby authenticating the client device 160 to the remote server 120.

In one or more embodiments, the remote server 120 can transmit, transfer, or otherwise provide one or more machine readable instruction sets 175 to the one or more client devices 160. In one or more specific embodiments, the one or more instruction sets 175 can be provided by the remote server 120 to the one or more client devices 160 after the remote server 120 authenticates the client device 160 using the one or more authenticators 110 provided by the client device 160 to the remote server 120. In one or more specific embodiments, the one or more machine readable instruction sets 175 can partially or completely enable one or more system resources 165 disposed in, on, or about the one or more client servers 140 or the one or more client devices 160.

Figure 2:
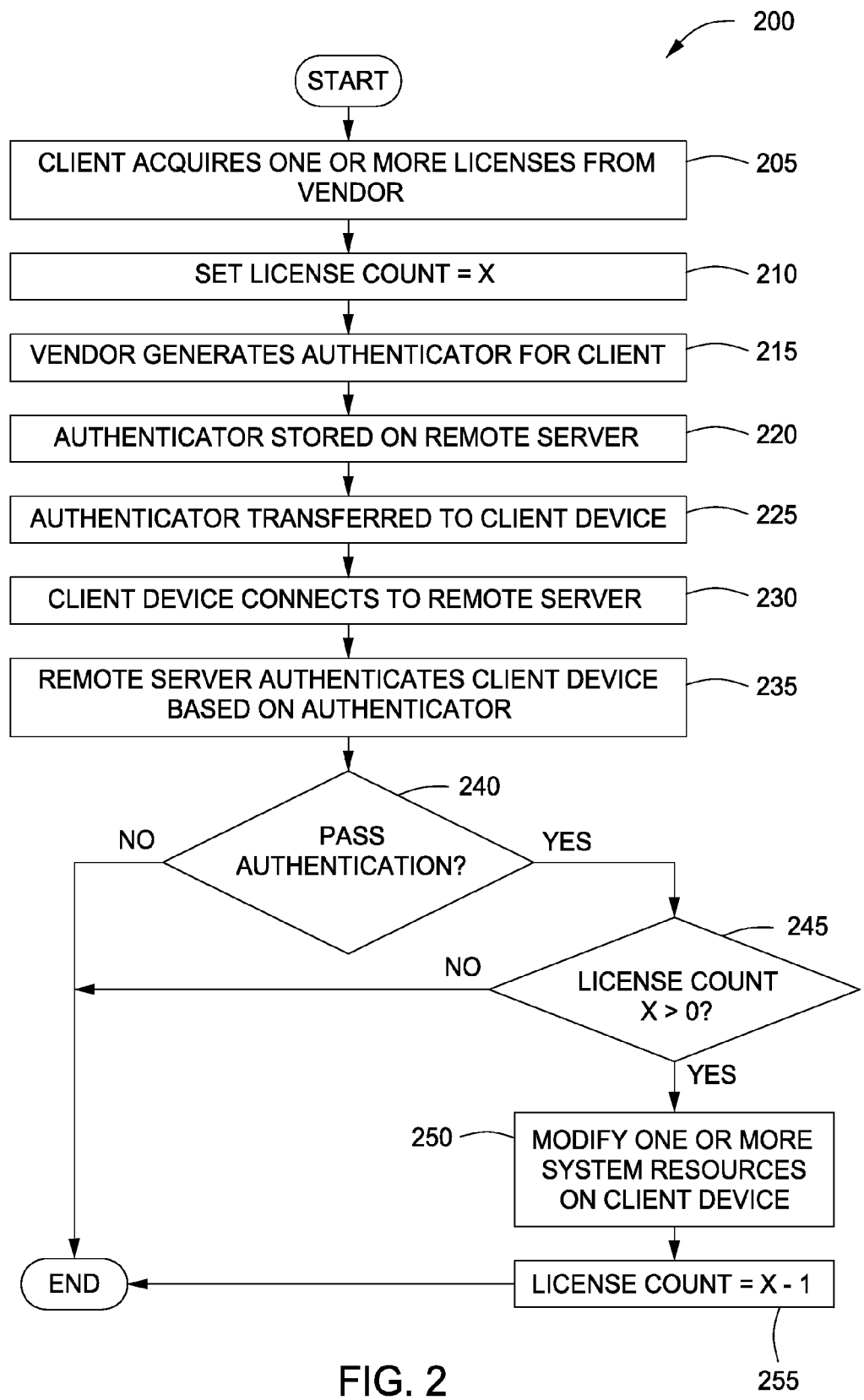
FIG. 2 is an exemplary logic flow diagram for remotely modifying one or more system resources, according to one or more embodiments described herein.

FIG. 2 is an exemplary logic flow diagram 200 depicting an illustrative system 100 for remotely modifying one or more system resources 165, according to one or more embodiments. In one or more embodiments, a client can acquire one or more client servers 140 and one or more client devices 160 from a vendor. In one or more specific embodiments, one or more system resources 165 and/or one or more scripts 170 can be disposed in, on, or about the one or more client servers 140 or the one or more client devices 160.

In step 205, the client can acquire one or more licenses 105 from the vendor. In one or more embodiments, the one or more licenses 105 acquired by the client can permit the modification of the one or more system resources 165 disposed in, on, or about the one or more client servers 140 or client devices 160. In one or more embodiments, in step 210, based on the number of licenses 105 acquired by the client, a client license count can be stored as a digital data file disposed in, on, or about one or more remote servers 120, for example one or more vendor enterprise servers. In one or more specific embodiments, the vendor can set the client license count equal to "X" on the remote server 120, where "X" can represent the number of licenses 105 acquired or otherwise possessed by the client. In one or more embodiments, the one or more licenses 105 can authorize the modification of one or more system resources 165 disposed in, on, or about the one or more client servers 140 or client devices 160.

In one or more embodiments, the vendor, in step 215, can generate one or more authenticators 110. In one or more embodiments, the one or more authenticators 110 can be a digital certificate that is unique and private to the client.

In one or more embodiments, in step 220, the one or more authenticators 110 can be stored or otherwise archived in the form of digital data disposed in, on, or about the remote server 120. In one or more embodiments, the one or more authenticators 110 can be disposed in, on, or about the one or more client devices 160. The operable connection between the remote server 120 and the one or more client devices 160 can be via direct operable connection, i.e. without the use of an interposing client server 140, or via indirect operable connection, i.e. with the use of at least one interposing client server 140.

In one or more embodiments, in step 225, the one or more authenticators 110 can be transported, transmitted, or otherwise transferred from the remote server 120 to the one or more client devices 160 via one or more networks 130. In one or more specific embodiments, the one or more authenticators 110 can be transmitted or otherwise transferred from the remote server 120 to the client server 140 via one or more networks 130. From the client server 140, the one or more authenticators 110 can then be transferred to the one or more client devices 160 via one or more networks 150. In one or more embodiments, the one or more networks 130, can include, but are not limited to one or more LANs, one or more WANs, the internet or combinations thereof. In one or more embodiments, the one or more networks 150, can include, but are not limited to one or more LANs, one or more WANs, the internet or combinations thereof.

In one or more embodiments, the one or more client devices 160 can be operatively connected to the remote server 120 via the one or more networks 130 in step 230. In one or more specific embodiments, the operative connection between the one or more client devices 160 and the remote server 120 can be at least partially initiated by running or otherwise executing one or more scripts 170 disposed at least partially in, on, or about the one or more client devices 160. In one or more specific embodiments, execution of the one or more scripts 170 can be initiated by one or more instructions generated by the client server 140 and transmitted to one or more operatively connected client devices 160 via the network 150.

In one or more embodiments, the one or more client devices 160 can transfer or otherwise transmit one or more digital data files to the remote server 120 via the network 130. In one or more embodiments, the one or more digital files can include one or more authenticators 110. In one or more embodiments, the one or more digital data files can include one or more systems capability records 300. In one or more specific embodiments, the one or more digital data files can include one or more authenticators 110 and one or more systems capability records 300.

Figure 3:
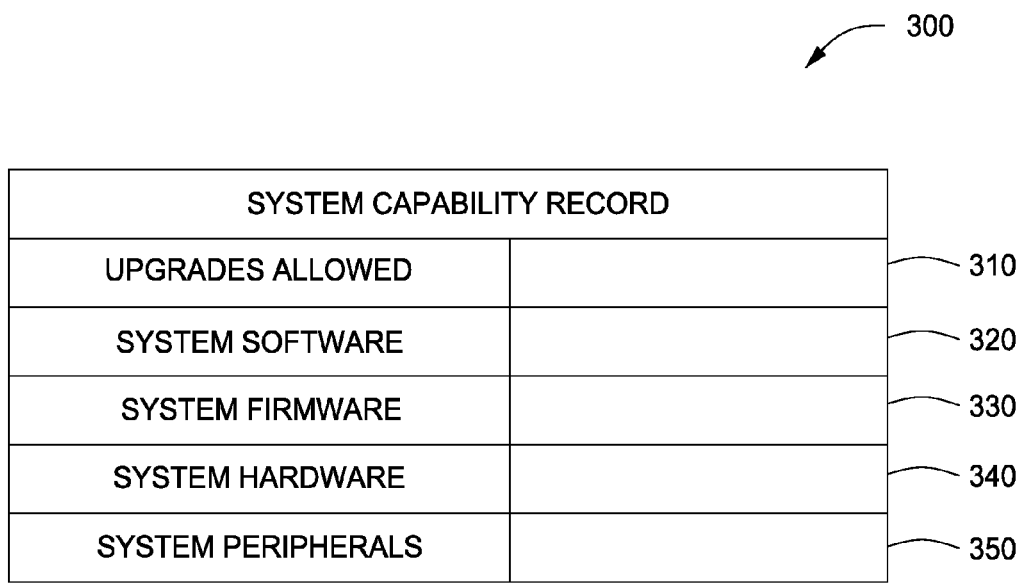
FIG. 3 is a schematic diagram depicting an exemplary system capability record according to one or more embodiments described herein.

FIG. 3 depicts an exemplary system capability record 300 according to one or more embodiments. In one or more embodiments, the system capability record 300 transmitted from the client device 160 to the remote server 120 can include data indicating whether a system resource 165 can be modified on a particular client server 140 or client device 160. In one or more embodiments, the system capability record 300 can include client device 160 system data including, but not limited to, system software data 320, system firmware data 330, system hardware data 340, system peripheral data 350, or any combination thereof.

In one or more embodiments, a first section 310 of the system capability record 300 can provide data to the remote server 120 regarding the status of the one or more system resources 165 disposed in, on, or about the client server 140 or client device 160. In one or more embodiments, the data can include which of the one or more system resources 165 can be modified based upon the one or more licenses 105 acquired by the client. In one or more embodiments, eligibility can also be based, all or in part, upon one or more systems, devices, or combination of systems and/or devices disposed in, on, or about the client server 140 or client device 160.

In one or more embodiments, the second section 320 of the system capability record 300 can include a record of the software installed on the client server 140 or client device 160. Software data supplied in the second section 320 of the system capability record 300 can include, but is not limited to, operating system data such as O/S type, O/S version, O/S build, and the like. Software data supplied in the second section 320 on the system capability record 300 can include, but is not limited to, application data such as application type, application version, application build, and the like.

In one or more embodiments, the third section 330 of the system capability record 300 can provide data to the remote server 120 regarding the firmware installed on the client server 140 or client device 160. Firmware data supplied in the third section 330 of the system capability record 300 can include, but is not limited to, basic input/output system ("BIOS") data such as BIOS type, BIOS version, and the like.

In one or more embodiments, the fourth section 340 of the system capability record 300 can provide data to the remote server 120 regarding the hardware installed on the client server 140 or client device 160. Hardware data supplied in the fourth section 340 of the system capability record 300 can include, but is not limited to, central processing unit ("CPU") type, actual CPU clock speed, possible CPU clock speed(s), front bus type, front bus speed, graphical processing unit type, graphical processing unit capabilities, random access memory (RAM) type, RAM size, installed expansion cards, installed data storage devices such as hard disk drives (HDDs) and solid state drives (SSDs), or the like.

In one or more embodiments, the fifth section 350 of the system capability record 300 can provide data to the remote server 120 regarding system peripherals installed on the client server 140 or client device 160. System peripheral data supplied in the fifth section 350 of the system capability record 300 can include, but is not limited to, connected devices such as printers, mass storage devices, network connections, or the like.

Referring again to FIG. 2, in step 235 the one or more client devices 160 can authenticate or otherwise confirm the identity of the client device 160 via the one or more authenticators 110 and/or the one or more systems capability records 300 transmitted to the remote server 120. In one or more embodiments, the remote server 120 can compare, in part or in total, the one or more authenticators 110 transmitted by the client device 160 to the one or more authenticators 110 disposed in, on, or about the remote server 120. If the client device 160 fails the authentication process in step 240, the process can terminate. However, if the client device 160 passes the authentication process in step 240, the number of available licenses on the remote server 120 can be confirmed in step 245.

If no licenses are available on the remote server 120, the process can terminate. However, if one or more licenses 105 are available the remote server 120, the remote server 120 can provide one or more digital files 175 to modify the one or more system resources 165. In one or more embodiments, the one or more digital files provided by the remote server 120 can include one or more scripts executed by the client device 160, the remote server 120, or any combination thereof. In one or more embodiments, after successfully modifying the one or more system resources 165 in step 250, the remote server 120 can decrement the available license count in step 255.

Though depicted sequential for convenience, discussion and readability, at least some of the actions, steps, or sequences shown in FIG. 2 can be performed in a different order and/or in parallel. Additionally, one or more specific embodiments may perform only a limited number of the actions, steps, or sequences shown in FIG. 2. Additionally, one or more actions, steps, or sequences can be performed using a second processor disposed proximate or remote from the first processor executing all or a portion of the one or more actions, steps, or sequences depicted in FIG. 2.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method performed by a processor of modifying one or more system resources at least partially disposed within a client device, the method comprising:
    setting a license count;
    generating an authenticator on a remote server;
    transferring the authenticator to the client device;
    connecting the client device to the remote server;
    authenticating the client device to the remote server to establish the eligibility of the client device to control the one or more system resources at least partially disposed within the client device based on the authenticator and one or more system records, the one or more system records including modification eligibility of the one or more system resources;
    confirming the license count is greater than zero;
    modifying the one or more system resources at least partially disposed within the client device; and
    decrementing the license count.

2. The method of claim 1, wherein transferring the authenticator to the client device comprises transferring the authenticator from the remote server to the client device via an interposing client server.

3. The method of claim 1 wherein the remote server comprises a vendor enterprise server.

4. The method of claim 1, further comprising transmitting one the one or more system resource capability records from the client device to the remote server.

5. The method of claim 2, wherein connecting the client device to the remote server comprises executing, at the direction of the client server, at least one script disposed at least partially within the client device.

6. The method of claim 1, wherein the one or more system resources disposed in, on, or about the client device are selected from the group of system resources consisting of: software, firmware, and hardware.

7. The method of claim 1, wherein the authenticator comprises a digital certificate; and, wherein all or a portion of the digital certificate comprises a customer identifier, a client device identifier, or a client server identifier.

8. A method, performed by a processor, of modifying one or more system resources at least partially disposed within a client device, the method comprising:
    acquiring one or more licenses for controlling one or more system resources disposed at least partially within the client device, wherein the one or more system resources are selected from a group of system resources including software, firmware, and hardware;
    storing the one or more licenses on a network-accessible remote server;
    generating an authenticator;
    storing the authenticator on a remote server;
    transferring at least a portion of the authenticator from the remote server to a client server;
    transferring at least a portion of the authenticator from the client server to a client device;
    executing one or more scripts at least partially disposed within the client device;
        wherein the one or more scripts operably connect the client device to the remote server;
        wherein the one or more scripts authenticate the client device based upon the presence of the authenticator at least partially disposed within the client device and based upon the presence of one or more system records including modification eligibility of the one or more system resources; and
        wherein the one or more scripts establish the eligibility of the client device to control one or more system resources at least partially disposed within the client device;
    confirming at least one of the one or more licenses remain available on the remote server;
    modifying one or more system resources at least partially disposed within the client device; and
    decrementing the one or more licenses on the remote server.

9. The method of claim 8, wherein modifying one or more system resources comprises enabling one or more disabled system resources disposed at least partially within the client device.

10. The method of claim 8, wherein modifying one or more system resources comprises disabling one or more enabled system resources disposed at least partially within the client device.

11. The method of claim 8, wherein the authenticator comprises a digital certificate; and wherein at least a portion of the digital certificate includes a digital identifier, the digital identifier uniquely identifiable to a particular client.

12. The method of claim 8, wherein the remote server comprises a vendor enterprise server.

13. The method of claim 8, wherein the network is selected from a group of networks consisting of: the world-wide web ("internet"); a local area network ("LAN"); a wide area network ("WAN"); a cellular network; a wireless distributed network; or a wireless local area network ("WLAN").

14. A system for modifying, by a processor, one or more system resources at least partially disposed within one or more client devices comprising:
    a means for storing a license count;
    a means for generating an authenticator at a remote server;
    a means for storing the authenticator at the remote server;
    a means for transmitting the authenticator to the one or more client devices;
    a means for connecting the one or more client devices to the remote server;
    a means for authenticating the one or more client devices using the authenticator and one or more system records including modification eligibility of the one or more system resources;
    a means for determining the eligibility of the one or more client devices to modify the one or more system resources disposed in, on, or about the one or more client devices wherein the one or more system resources are selected from a group including software, firmware, and hardware;
    a means for modifying the one or more system resources disposed in, on, or about the one or more client devices; and
    a means for decrementing the license count.

15. The system of claim 14, wherein the means for authenticating the one or more client devices using the authenticator comprises comparing the authenticator provided by the client device with the authenticator stored on the remote server.

16. The system of claim 14, wherein the means for transmitting the authenticator to the one or more client devices comprises a vendor enterprise server operably connected to one or more client devices via one or more client servers.

17. The system of claim 14, wherein the authenticator comprises a digital certificate; and wherein at least a portion of the digital certificate includes a digital identifier uniquely identifiable to a particular client.

18. The system of claim 14, wherein the means for determining the eligibility of the one or more client devices to modify the one or more system resources comprises a means for determining whether the license count is greater than zero.

19. The system of claim 14, wherein modifying the one or more system resources comprises enabling one or more disabled system resources disposed at least partially within the client device.

20. The system of claim 14, wherein modifying the one or more system resources comprises disabling one or more enabled system resources disposed at least partially within the client device.

* * * * *

UNITED STATES PATENT AND TRADEMARK OFFICE
CERTIFICATE OF CORRECTION

PATENT NO. : 8,438,624 B2
APPLICATION NO. : 12/397076
DATED : May 7, 2013
INVENTOR(S) : Paul J Broyles et al.

Page 1 of 1

It is certified that error appears in the above-identified patent and that said Letters Patent is hereby corrected as shown below:

In the Claims:

In column 9, line 42, in Claim 4, delete "one the" and insert -- the --, therefor.

Signed and Sealed this
Twentieth Day of August, 2013

Teresa Stanek Rea
*Acting Director of the United States Patent and Trademark Office*